US011522758B1

(12) United States Patent
Mutalikdesai et al.

(10) Patent No.: US 11,522,758 B1
(45) Date of Patent: Dec. 6, 2022

(54) PRESERVING DATA INTEGRITY IN COGNITIVE MULTI-AGENT SYSTEMS

(71) Applicant: International Business Machines Corporation, Armonk, NY (US)

(72) Inventors: Mandar Mutalikdesai, Bengaluru (IN); Ashish Rao, Bangalore (IN); Yash Vardhan Singh, Bangalore (IN); Shivam Ratnakar, Thane (IN); Shivangi Tak, Gurgaon (IN); Sandipto Neogi, Bangalore (IN); Anagha M, Palakkad Dt (IN); Pranjal Srivastava, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/473,556

(22) Filed: Sep. 13, 2021

(51) Int. Cl.
*H04L 41/0813* (2022.01)
*H04L 41/12* (2022.01)
*G06N 20/20* (2019.01)
*G06N 20/00* (2019.01)

(52) U.S. Cl.
CPC ......... *H04L 41/0813* (2013.01); *G06N 20/20* (2019.01); *H04L 41/12* (2013.01); *G06N 20/00* (2019.01)

(58) Field of Classification Search
CPC ..... H04L 41/0813; H04L 41/12; G06N 20/20; G06N 20/00
See application file for complete search history.

(56) References Cited

U.S. PATENT DOCUMENTS

| 7,251,654 | B2 | 7/2007 | Eiron | |
| 8,681,155 | B2 | 3/2014 | Basak | |
| 9,165,040 | B1 | 10/2015 | Hajaj | |
| 9,300,755 | B2 | 3/2016 | Gerke | |
| 10,999,132 | B1* | 5/2021 | Sagar | H04L 41/046 |
| 11,063,745 | B1* | 7/2021 | Du | H04L 9/0825 |
| 2013/0282810 | A1 | 10/2013 | Lessin | |
| 2018/0322407 | A1 | 11/2018 | Baum | |
| 2019/0114549 | A1 | 4/2019 | Olsher | |
| 2020/0167145 | A1 | 5/2020 | Franchitti | |
| 2021/0328798 | A1* | 10/2021 | Liu | H04L 9/3247 |

OTHER PUBLICATIONS

Kumar et al., "Detecting misinformation in online social networks using cognitive psychology," Human-centric Computing and Information Sciences, 4.1, 2014, 22 pages.

(Continued)

*Primary Examiner* — Tonia L Dollinger
*Assistant Examiner* — Joseph M Cousins
(74) *Attorney, Agent, or Firm* — VanLeeuwen & VanLeeuwen; Christopher M. Pignato

(57) ABSTRACT

An approach is provided in which the approach applies, by a first node, a first axiom to a set of data points to generate a set of first outputs. The approach applies, by a second node, a second axiom to the set of data points to generate a set of second outputs. The first node and the second node are part of a computer network that includes multiple nodes. The approach computes a first nuance based on a set of disagreements between the set of first outputs and the set of second outputs, and adjusts a reliability of the first node in the computer network based on the first nuance.

20 Claims, 8 Drawing Sheets

(56) References Cited

OTHER PUBLICATIONS

Yin et al., "Analysis of the Dynamic Influence of Social Network Nodes," Scientific Programming, vol. 2017, Article ID 5046905,2017, 6 pages.
Abbasi et al., "Measuring user credibility in social media," International Conference on Social Computing, Behavioral-Cultural Modeling, and Prediction, Springer, Berlin, Heidelberg, Washington, DC, Apr. 2013, 8 pages.
Bhattacharjee et al., "Preserving Data Integrity in IoT Networks Under Opportunistic Data Manipulation," 2017 IEEE 15th Intl Conf on Dependable, Autonomic and Secure Computing, 15th Intl Conf on Pervasive Intelligence and Computing, 3rd Intl Conf on Big Data Intelligence and Computing and Cyber Science and Technology Congress (DASC/PiCom/DataCom/CyberSciTech), Orlando, FL, USA, 2017, pp. 446-453.
Bidoni et al., "A Generalization of the PageRank Algorithm," ICDS 2014, The Eighth International Conference on Digital Society, 2014, pp. 108-113.
Cheng et al., "Learning Bayesian networks from data: An information-theory based approach," Artificial intelligence 137.1-2, 2002, 8 pages.
Dhaou et al., "Belief Approach for Social Networks," In: Cuzzolin F. (eds) Belief Functions: Theory and Applications, BELIEF 2014, Lecture Notes in Computer Science, vol. 8764, Springer, Cham, 2014, 10 pages.
Hu et al., "Assessing the credibility of nodes on multiple-relational social networks," International Conference on Web Information Systems Engineering, Thessaloniki, Greece, Oct. 2014, 16 pages.
Hurley et al., "Multi-Layer Combinatorial Fusion Using Cognitive Diversity," in IEEE Access, vol. 9, Dec. 2020, pp. 3919-3935.
Kamvar et al., "The Eigentrust Algorithm for Reputation Management in P2P Networks," Proceedings of the 12th international conference on World Wide Web, May 2003, Budapest, Hungary, 12 pages.
Khan et al., "Term Ranker: A Graph-Based Re-Ranking Approach," FLAIRS Conference, Proceedings of the Twenty-Ninth International Florida Artificial Intelligence Research Society Conference, Key Largo, Florida, May 2016, 6 pages.
Li et al., "Preserving data integrity for smart grid data aggregation," 2012 IEEE Third International Conference on Smart Grid Communications (SmartGridComm), IEEE, Tainan, Taiwan, Nov. 2012, 6 pages.
Mohammadinejad et al., "Employing personality feature to rank the influential users in signed networks," 2016 EEE International Conferences on Big Data and Cloud Computing (BDCloud), Social Computing and Networking (SocialCom), Sustainable Computing and Communications (SustainCom) (BDCloud—SocialCom—SustainCom), Oct. 2016, Atlanta, GA, pp. 346-353.
Ozdemir et al.,"Integrity protecting hierarchical concealed data aggregation for wireless sensor networks," Computer Networks 55, Jan. 2011, pp. 1735-1746.
Page et al., "The PageRank citation ranking: Bringing order to the web," Stanford InfoLab, Jan. 1998, 17 pages.
Salehi-Abari et al., "Ranking networks," NIPS-13 Workshop on Frontiers of Network Analysis: Methods, Models, and Applications, Lake Tahoe, Nevada, Dec. 2013, 9 pages.
Shahriari et al., "Ranking nodes in signed social networks," Social network analysis and mining, 4.1, Jan. 2014, 12 pages.
Sun et al., "Ranking Methods for Networks," Encyclopedia of Social Network Analysis and Mining, 2014, 21 pages.
Vieira et al., "Efficient Search Ranking in Social Networks," Proceedings of the Sixteenth ACM Conference on Information and Knowledge Management, Nov. 2007, pp. 563-572.
Wan et al., "Signrank: A novel random walking based ranking algorithm in signed networks," Wireless Communications and Mobile Computing, vol. 2019, Article ID 4813717, 2019, 8 pages.
Zhao et al., "Ranking Users in Social Networks with Higher-Order Structures," Proceedings of the Thirty-Second AAAI Conference on Artificial Intelligence, vol. 32, No. 1, 2018, pp. 232-239.

\* cited by examiner

US 11,522,758 B1

PRESERVING DATA INTEGRITY IN COGNITIVE MULTI-AGENT SYSTEMS

BACKGROUND

The advancement in computing hardware technology has caused a rapid growth in usage of intelligent/cognitive computing devices for automation. A majority of these systems rely on sensors to gather data required to automate decision making processes. For example, manual monitoring of temperatures in nuclear power plants can be replaced by an array of heat sensors and programmable logic controller (PLC) for releasing cooling agents. Based on the temperature data gathered from these sensors, a PLC can limit manual intervention required for maintaining the reactor temperature. This can make a huge difference in catastrophic events such as a reactor meltdown. Therefore, it becomes necessary to preserve data integrity among such devices to ensure quality automation of decision-making. In a scenario where four out of ten heat sensors malfunction, it becomes crucial to detect the malfunctioning ones.

Often, these sensors/cognitive devices have their own cognitive processes to detect a phenomenon (e.g., temperature) and map it to a numeric value. These devices are usually deployed as a network that allows data points such as temperature values to be shared among each device. This data-sharing enables large scale automation. For example, a network of 50 devices can be used to estimate the weather readings of an area of about 100 sq·km. A set of N devices (e.g., N=5) can be responsible for every 10 sq·km. By sharing weather data between N adjacent devices within an area, an aggregated weather reading of that area can be estimated. Each node in the area can rely on the data sent by the adjacent N−1 nodes to determine its own accuracy.

BRIEF SUMMARY

According to one embodiment of the present disclosure, an approach is provided in which the approach applies, by a first node, a first axiom to a set of data points to generate a set of first outputs. The approach applies, by a second node, a second axiom to the set of data points to generate a set of second outputs. The first node and the second node are part of a computer network that includes multiple nodes. The approach computes a first nuance based on a set of disagreements between the set of first outputs and the set of second outputs, and adjusts a reliability of the first node in the computer network based on the first nuance.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein.

DETAILED DESCRIPTION

Figure 1:
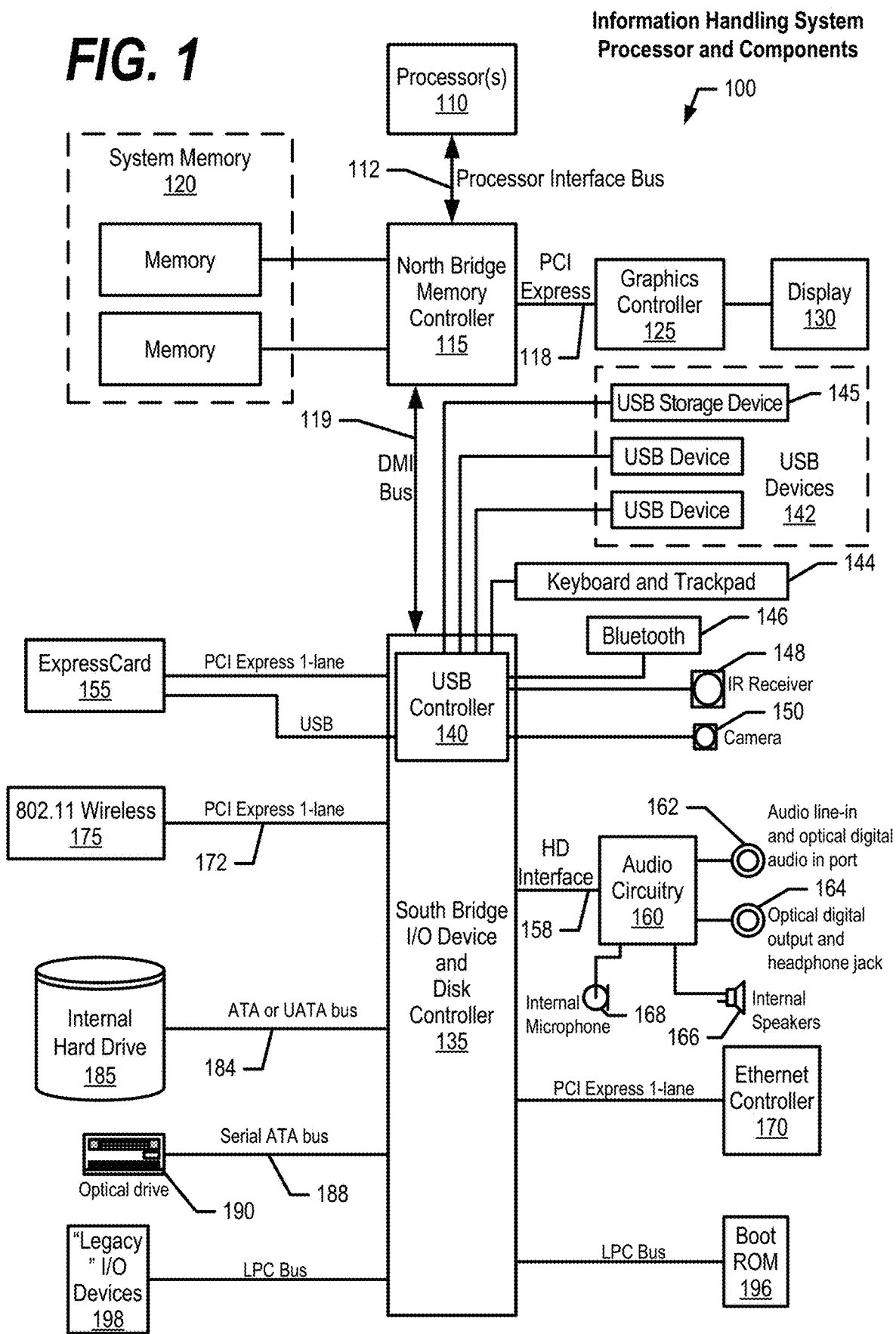
FIG. 1 is a block diagram of a data processing system in which the methods described herein can be implemented.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The following detailed description will generally follow the summary of the disclosure, as set forth above, further explaining and expanding the definitions of the various aspects and embodiments of the disclosure as necessary.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, Peripheral Component Interconnect (PCI) Express bus 118 connects Northbridge 115 to graphics controller 125. Graphics controller 125 connects to display device 130, such as a computer monitor.

Northbridge 115 and Southbridge 135 connect to each other using bus 119. In some embodiments, the bus is a Direct Media Interface (DMI) bus that transfers data at high speeds in each direction between Northbridge 115 and Southbridge 135. In some embodiments, a PCI bus connects the Northbridge and the Southbridge. Southbridge 135, also known as the Input/Output (I/O) Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and Universal Serial Bus (USB) connectivity as it connects to Southbridge 135 using both the USB and the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, Integrated Services Digital Network (ISDN) connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the Institute of Electrical and Electronic Engineers (IEEE) 802.11 standards of over-the-air modulation techniques that all use the same protocol to wirelessly communicate between information handling system 100 and another computer system or device. Optical storage device 190 connects to Southbridge 135 using Serial Analog Telephone Adapter (ATA) (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality associated with audio hardware such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, Automated Teller Machine (ATM), a portable telephone device, a communication device or other devices that include a processor and memory.

Figure 2:
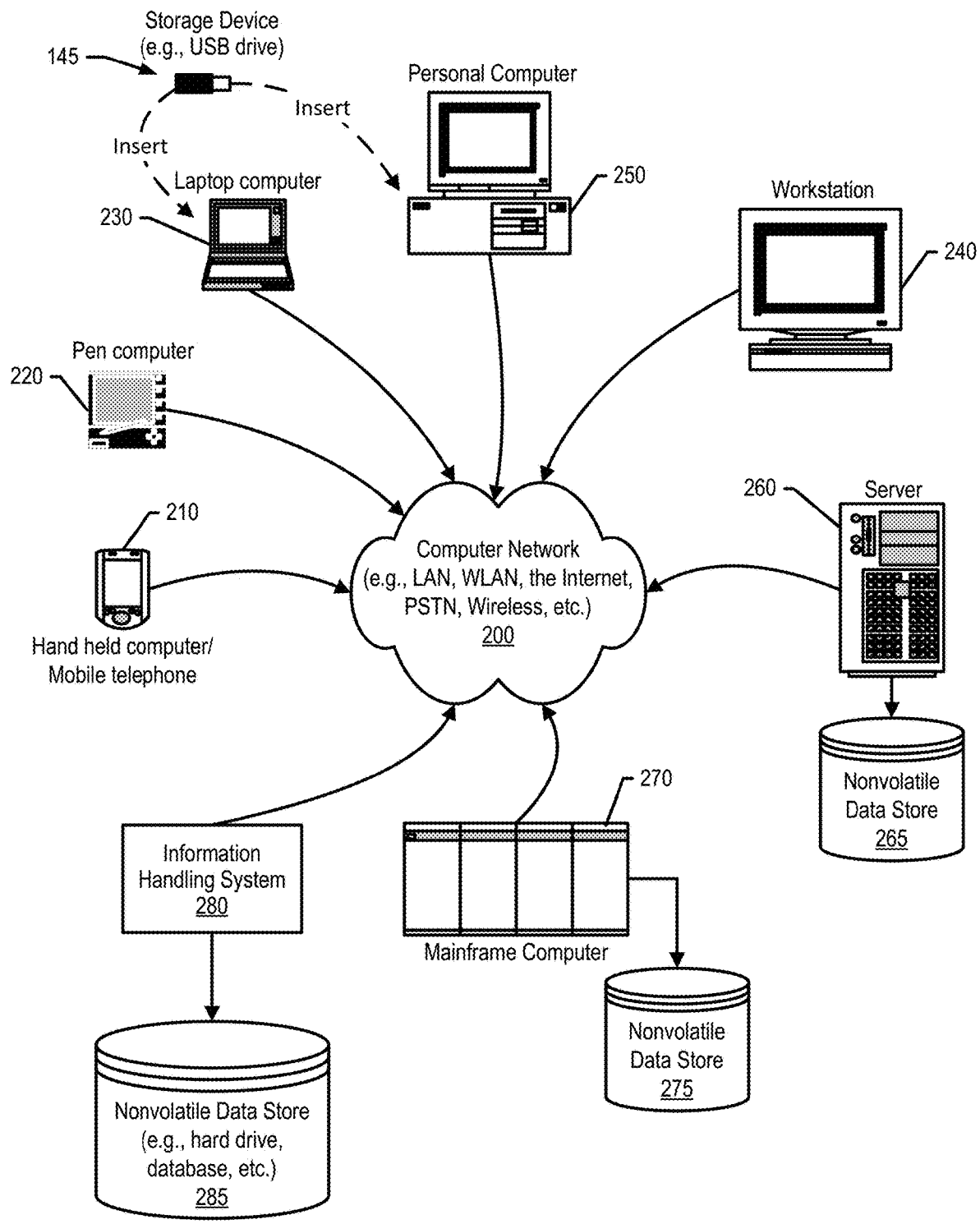
FIG. 2 provides an extension of the information handling system environment shown in FIG. 1 to illustrate that the methods described herein can be performed on a wide variety of information handling systems which operate in a networked environment.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as Moving Picture Experts Group Layer-3 Audio (MP3) players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. The embodiment of the information handling system shown in FIG. 2 includes separate nonvolatile data stores (more specifically, server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

As discussed above, a fundamental aspect of nodes/sensors in a cognitive multi-agent network having nuance is their axioms, and nodes in a cognitive multi-agent network interact with each other by assigning weights to their neighbors based on the data they receive from them. A challenge found with existing systems is that although the existing systems have mechanisms to rank the nodes, the existing systems do not take the nodes' axioms on data points into account. In addition, although existing systems may assess reputations of the nodes, the existing systems do not consider the nuance of each node based on its independent cognitive ability to hold an axiom. In other words, existing systems do not take into account how a node's cognitive process differs from other nodes with respect to different data points the node receives.

To detect the malfunctioning sensors/devices it is necessary to analyze their behavior in detecting the required phenomenon. Often the numeric readings of a malfunctioning sensor will not agree with most of the sensors in the sub-network or neighborhood. This continuous difference in reading values makes a malfunctioning node less nuanced.

A fundamental aspect of nodes/sensors in a cognitive multi-agent network having nuance (subtle differences) is their axioms. A node's axiom is the inherent property of the node, which denotes a node's local world view towards any data point it receives. This axiom is similar to a well-established truth for the node and is considered as the basis for the node's decision-making process. For example, for a weather processing node in the above-mentioned scenario, a node's axiom could be "the temperature of a boiler cannot be below 0 degrees centigrade." The node takes this belief or axiom at face value either because the node has been programmed as such or because the node's experience has been such.

Nodes in a cognitive multi-agent network interact with each other by assigning weights to their neighbors based on the data they receive from them. These weights are a measure of the importance a node assigns to the data received from its neighbors. The weights they assign to another node depend on: (a) their own axioms, and (b) the data they themselves are producing. If the weightages given to a particular node by its neighbors are high, then it is not likely for the particular node to be a malfunctioning node as the data points sent by this node are consistent with (a) the axioms of the neighboring nodes, and (b) the data points produced by the neighboring nodes FIGS. 3 through 8 depict an approach that can be executed on an information handling system that preserves data integrity in large, autonomous, cognitive multi-agent systems. The approach evaluates the nuance of nodes in a cognitive multi-agent system based on axioms. Then, the approach computes the reliability of nodes in a cognitive multi-agent system based on axioms and nuances. In turn, the approach iteratively updates axioms of nodes in the cognitive multi-agent system based on the nuances.

Figure 3:
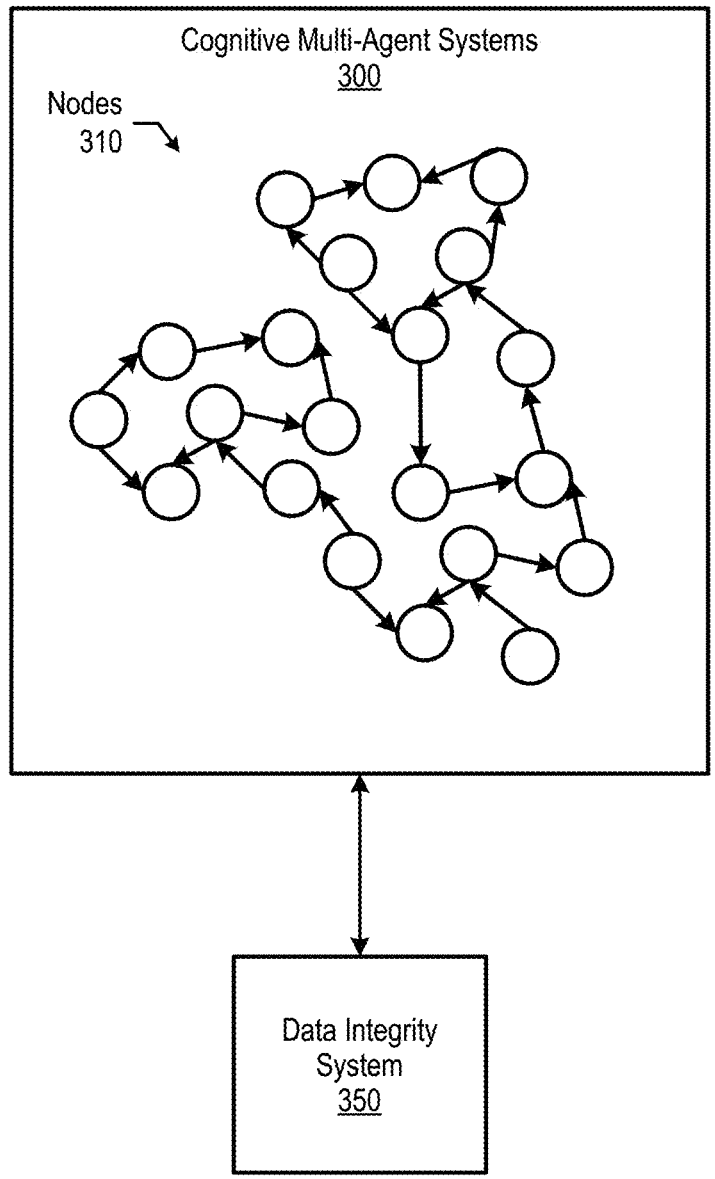
FIG. 3 is an exemplary diagram depicting a data integrity system preserving the integrity of multi-agent systems.

FIG. 3 is an exemplary diagram depicting a data integrity system preserving the integrity of multi-agent systems. Data integrity systems 350 provide a mechanism to compute the nuances of nodes 310 in cognitive multi-agent systems 300 using their axioms on different input data points. In one embodiment, data integrity systems 350 assigns nuances based on a node's axioms on input data points in applications such as i) reliable weather monitoring and forecasting over a huge area; reliable maintenance and monitoring of temperature in heat sensitive equipment; reliable navigation and global positioning using satellite data; and reliable deployment of edge devices at scale.

In one embodiment, a network of cognitive multi-agent systems includes two different types of embedded structures, such as an infrastructure network and an interaction network. In this embodiment, the infrastructure network includes actual connections between nodes which essentially configures the infrastructure for further data exchange (e.g., a constellation of satellites used for Global Positioning Systems). The interaction network is an overlay network of interactions between nodes that uses the underlying infrastructure network (e.g., the weights assigned by nodes to each other as a result of data exchange).

Data integrity system 350 employs an algorithm that defines measures such as axioms, disagreements, and nuance over the interaction network underlying a network of cognitive multi-agent systems 300. Once data integrity system 350 evaluates the nuances of nodes 310 in cognitive multi-agent systems 300 based on nodes 310's axioms, data integrity system 350 provides a mechanisms to compute the reliability of nodes 310 in preserving data integrity based on the nuances. The reliability of a node is an indicator of the independent nature of its cognitive process based on axioms held by the node on various data points. In addition, the reliability is a measure of data integrity and is iteratively defined on the reliability and nuances of the neighbors of the node and its own nuance.

In one embodiment, data integrity system 350 scores nodes 310 based on the convergence of reliability. The reliability scores determine which nodes are most reliable in preserving data-integrity of the network. The higher the reliability of a node, the less it is likely to corrupt data and the more it is likely to have preserved the integrity of the data. In turn, data integrity system 350 iteratively updates the axioms of nodes 310 in cognitive multi-agent systems 300 based on their nuances and reliability, which enables nodes 310 in multi-agent systems 300 to evolve with time.

Figure 4:
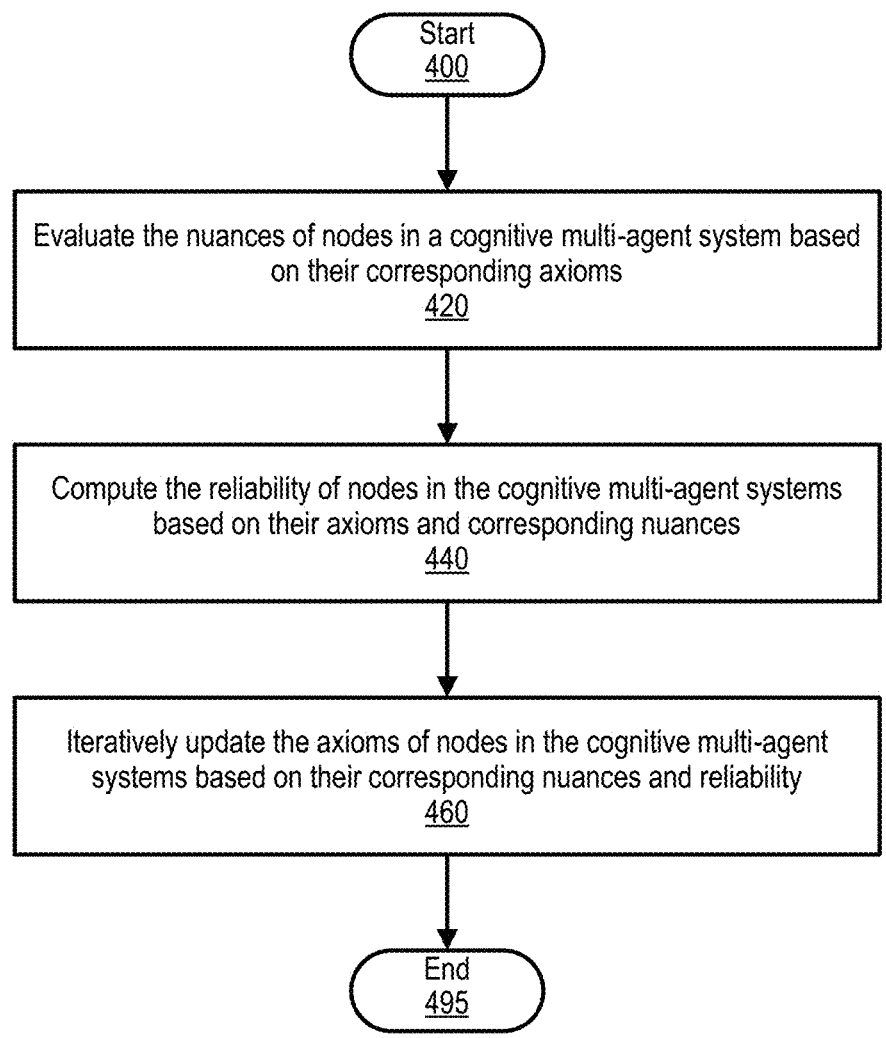
FIG. 4 is an exemplary flowchart showing steps taken to evaluate the nuances of nodes in a cognitive multi-agent system based on their axioms, compute their reliability, and iteratively update the axioms of the nodes accordingly.

FIG. 4 is an exemplary flowchart showing steps taken to evaluate the nuances of nodes in a cognitive multi-agent system based on their axioms, compute their reliability, and iteratively update the axioms of the nodes accordingly.

FIG. 4 processing commences at 400 whereupon, at step 420, the process evaluates the nuances of nodes 310 in cognitive multi-agent system 300 based on their axioms. In one embodiment, data integrity system 350 addresses the problem of calculating the nuances of nodes in cognitive multi-agent systems 300 based on their axioms on various input data-points they receive. Specifically, data integrity system 350 brings into focus the tendency of a node to correctly analyze the data points it receives and include them in its decision-making process based on the axioms it holds. This capability of analyzing data-points is referred to herein as the nuance of the node. As defined herein, the nuance is the variance a node shows in its analyzing capability of data points. In one embodiment, the variance is in the range [0, 1] (See FIG. 6 and corresponding text for further details).

In one embodiment, to evaluate nuance and to help characterize a node's analytical ability based on axioms, data integrity system 350 determines whether a node has tendencies such as i) whether a node holds the same axiom regardless of the data points it receives; ii) whether a node tends to compulsively disagree with other nodes regardless of the data points it receives; or iii) whether a node tends to agree or disagree with the other nodes without following a specific pattern over a set of data points.

In another embodiment, data integrity system 350 defines disagreements as differences of axioms of each node with other nodes. Disagreements are modeled in two ways. The first disagreement is a disagreement with an aggregated general opinion. With the first disagreement, for a given data point, data integrity system 350 computes the aggregated general opinion of the population, and subsequently computes the difference of axiom of each node with the general opinion. The second disagreement is a disagreement with individual nodes. With the second disagreement, for a batch of data points, data integrity system 350 computes the overall divergence in axiom of a node with other nodes. With either of the two disagreements, data integrity system 350 defines the nuance of a node as an aggregate (statistical moment) of the distribution of disagreements.

At step 440, the process computes the reliability of nodes in cognitive multi-agent system 300 based on their axioms and corresponding nuances. Data integrity system 350 defines node reliability based on the axiom held by a particular node and its corresponding nuance on data points. (see FIG. 7 and corresponding text for further details).

At step 460, the process iteratively updates the axioms of nodes in a cognitive multi-agent system based on their corresponding nuances and reliabilities. In one embodiment, data integrity system 350 performs simultaneous computations of nuances and reliabilities along with iteratively updating the nodes' axioms using one of three models described herein (see FIGS. 7, 8, and corresponding text for further details). Data integrity system 350 continues to score the nodes and determine which nodes are the most reliable for preserving data-integrity in the cognitive multi-agent systems 300. FIG. 4 processing thereafter ends at 495.

Figure 5:
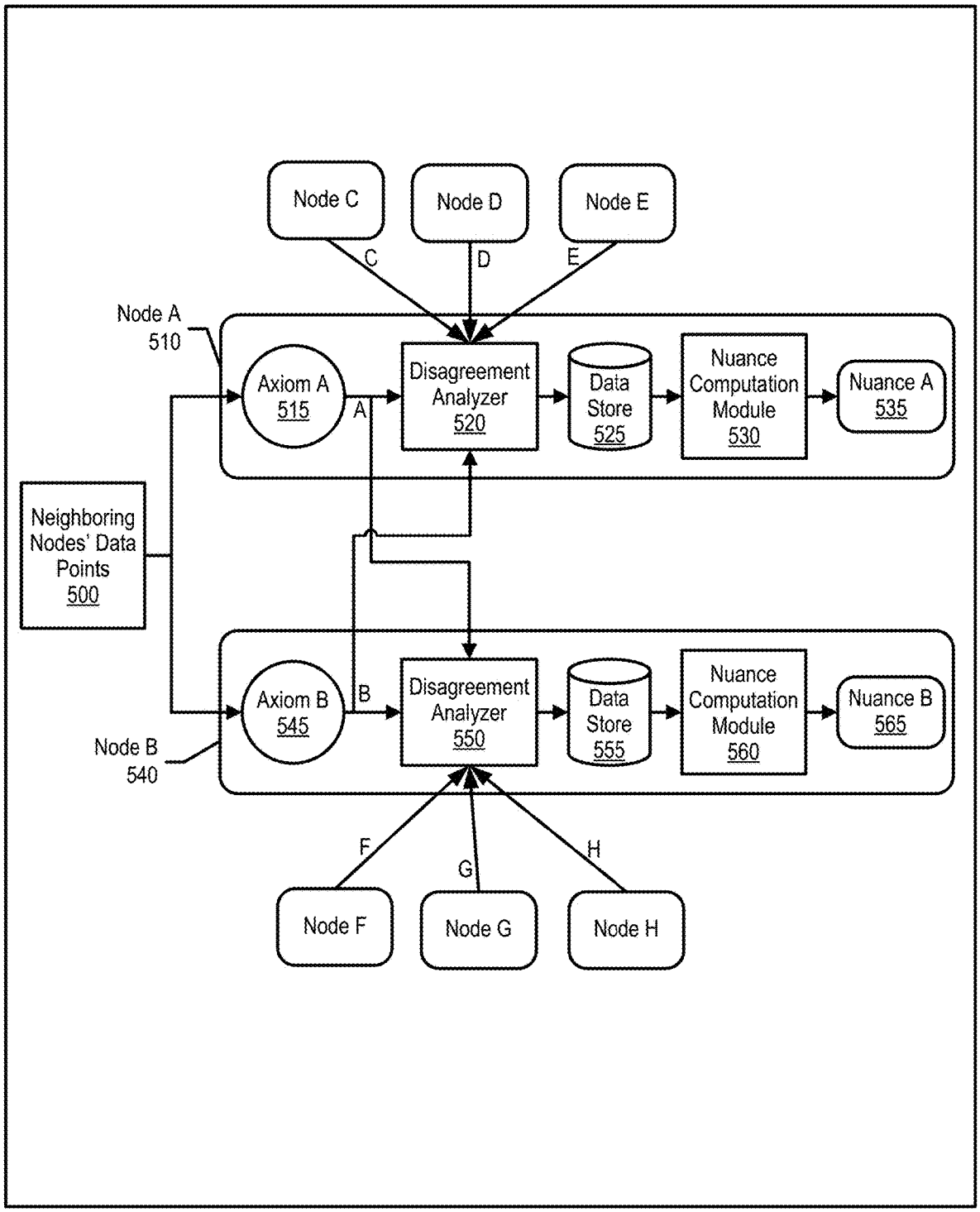
FIG. 5 is an exemplary diagram depicting data integrity system 350 determining disagreements within nodes over time and computing nuances of the nodes based on the disagreements.

FIG. 5 is an exemplary diagram depicting data integrity system 350 determining disagreements within nodes over time and computing nuances of the nodes based on the disagreements.

Neighboring nodes' data points 500 feed into both node A 510 and node B 540. Node A 510's axiom A 515 applies an interpretation to the input and outputs a numeric value "A." Likewise, node B 540's axiom B 545 applies an interpretation to the input and outputs a numeric value "B."

Node A 510's disagreement analyzer 520 evaluates disagreements between its value A and value B, as well as values C, D, and E from neighboring nodes C, D, and E. Disagreement analyzer 520 stores the disagreements (e.g., A=4, B=5, disagreement=2) in data store 525. Over time, disagreement analyzer 520 stores multiple disagreements in data store 525. Nuance computation module 530 analyzes the disagreements in data store 525 and computes nuance A 535 that, in one embodiment, ranges from 0 to 1 where a nuance close to 0 is a low nuance and a nuance close to 1 is a high nuance.

Similarly, node B 540's disagreement analyzer 550 evaluates disagreements between its value B and value A, as well as values F, G, and H from neighboring nodes F, G, and H. Disagreement analyzer 550 stores the disagreements in data store 555 and, over time, disagreement analyzer 550 stores multiple disagreements in data store 555. Nuance computation module 560 analyzes the disagreements in data store 555 and computes nuance B 565 that, in one embodiment, ranges from 0 to 1 where a nuance close to 0 is a low nuance and a nuance close to 1 is a high nuance.

As discussed herein, data integrity system 350 uses the computed nuances to evaluate the nodes and adjust their axioms as needed to improve the overall reliability of cognitive multi-agent systems 300.

Figure 6:
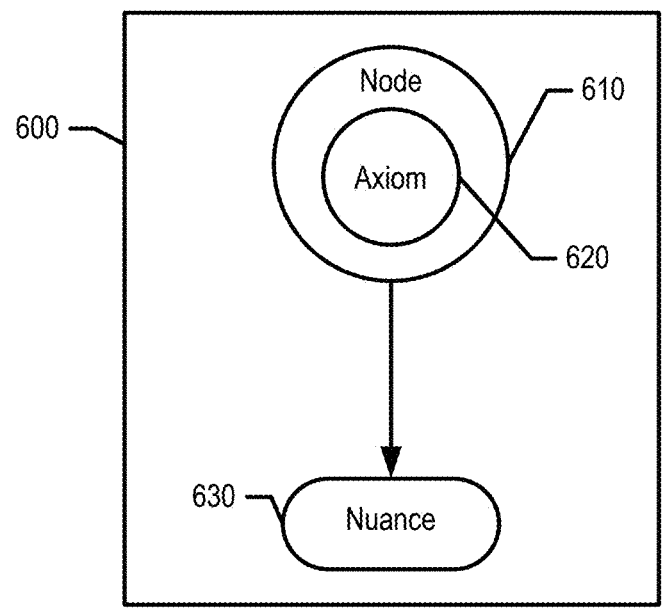
FIG. 6 is an exemplary diagram depicting a relationship between a node's axiom and nuance.

FIG. 6 is an exemplary diagram depicting a relationship between a node's axiom and nuance. Data integrity system 350 uses a novel approach of scoring nodes 310 in cognitive multi-agent systems 300 by considering the axioms held by nodes 310 on different data points and the nuances exercised by nodes 310. As discussed below, data integrity system 350's framework encompasses signed networks that capture up-vote and down-vote relationships between nodes as a factor in computing their corresponding nuances.

Diagram 600 shows node 610, axiom 620 and nuance 630. As discussed earlier, axiom 620 is an inherent property of node 610, which denotes node 610's local world view towards any data point it receives. Axiom 620 is a well-established truth for node 610 and is considered as a basis for node 610's decision-making process. Each of nodes 310 has autonomous cognitive processes that are based on their corresponding axioms on different data points. When node 610 receives a data point, node 610 applies axiom 620 and generates a perception towards the data point to be included in its decision-making process. As such, for every data point, node 610 generates a new perception using axiom 620. As discussed herein, axiom 620 can be changed by the influence of its neighbors (see FIG. 8 and corresponding text for further details).

Nuance 630 is the ability of node 630 to analyze different data points node 610 receives based on axiom 620. The output of node 610's cognitive process varies according to the data points it receives. As such, data integrity system 350 describes a cognitive system where independent nodes 310 in multi-agent systems 310 interact with each other and exchange data points and uses their nuances as a scoring mechanism for nodes 310.

Data integrity system 350 presents a model for scoring the nuances of nodes 310 in cognitive multi-agent systems 300 based on the axioms they hold. Data integrity system 350 momentarily treats the axioms of nodes on data points as an input; presents a basic mathematical model for computing disagreements; and then describes the computation of nuance using the disagreements. In one embodiment, data integrity system 350 defines a directed, unsigned graph Gu as $G_u=(V, E, w_u)$, where:

V is the set of nodes in the graph;

$E \subseteq V \times V$ is the set of ordered pairs of nodes representing edges in the graph; and $w_u: E \rightarrow [0,1]$ indicates the weights on the edges.

Data integrity system 350 then defines $G=(V, E, w)$ as a directed, signed graph where the weights on the edges are given by w: $E \rightarrow [-1,1]$. The range of the function $w_u$ is a subset of the range of the function w and a signed network (graph) is therefore a generalization of an unsigned network.

In one embodiment, data integrity system 350 uses the following as a basis for determining nuance 620:

i) An interaction network modeled as a directed graph represented by an adjacency matrix. Edges may be signed—for instance, edge weights represent up-vote (+1) or down-vote (−1) placed by the source node of the edge in the destination node.

ii) A set of data points that are exchanged through the network. Data integrity system 350 assumes that these are infused in the network in batches.

iii) An axiom held by each node on every data point that is exchanged through the network. Axioms are represented as a matrix where each column represents a vector of axioms of a node across all data points. Setting $X_n(i)$ as the axiom of node i on data point n, data integrity system 350 assumes that $X_n(i) \in [0, 1]$ where the value quantifies a node's axiom held on data point n.

For a data point n, data integrity system 350 computes a disagreement of a node with other nodes. First, data integrity system 350 describes the computation of disagreement of a node with an aggregated general opinion. For every data point, data integrity system 350 defines the general opinion $O_n$ to be the average of the axioms of all nodes which received the data point n:

$$O_n = \frac{\sum_i X_n(i)}{|S_n|} \quad (1)$$

where $|S_n|$ is the total number of nodes that received the data point. Next, data integrity system 350 computes the difference between the node's axiom and the general opinion for every data point and call it the disagreement $d_n(i)$:

$$d_n(i) = X_n(i) - O_n \quad (2)$$

In one embodiment, data integrity system 350 computes the disagreement of a node with individual nodes instead of the general opinion. For each node, data integrity system 350 defines the disagreement as a pairwise cosine dissimilarity or Euclidean distance between its own axiom vector and that of other nodes. Any other measure of distance (normalized to the interval [0,1]) may also be used in place of cosine or Euclidean distance:

$$d(i,j)=1-\cos(X(i),X(j)) \quad (3)$$

where X(i) is the axiom vector of node i for a batch of data-points, and:

$$d(i,j)=d(\vec{X}(i),\vec{Y}(j))=\sqrt{\Sigma_n(X_n(i)-X_n(j))^2} \quad (4)$$

where the summation is over the batch of data points.

Next, data integrity system 350 computes a disagreement vector. In one embodiment, data integrity system 350 uses equation (2) above to determine disagreements, where the disagreement vector for a node is defined as a set of disagreements of that node for all data points received by the node:

$$H(i)=\{d_n(i)\}_n \quad (5)$$

In another embodiment, data integrity system 350 uses equations 3 and 4 above to determine disagreements where the disagreement vector for a node is defined as a set of disagreements of that node with other nodes in the network:

$$H(i)=\{d(i,j)\}_j \quad (6)$$

For each node (node 610), data integrity system 350 computes its corresponding nuance where nuance 630 is defined as a variance of its disagreement vector:

$$\eta(i)=\sigma^2(H(i)) \quad (7)$$

Nuance 630 represents the ability of node 610 to analyze different data points node 610 receives based on axiom 620.

The output of a nuanced node's cognitive process varies according to the data points it receives. In one embodiment, nuance is bounded between [0,1] where a value closer to zero indicates the node is less nuanced, and a value closer to 1 means the node is highly nuanced. If node 610 agrees constantly with the general population on every data point, node 610 exhibits a conformist behavior. If node 610 constantly disagrees with the general population on every data point, node 610 exhibits a contrarian behavior. Neither of these behaviors are classified as nuanced because, in both cases node 610's disagreement vector has a small variance.

On the other hand, if node 610 does not exhibit any specific pattern in its agreement or disagreement with other nodes, node 610 is considered nuanced (nuance 630) and consequently the variance of node 610's disagreement vector is high. The nodes in the network are scored based on their corresponding nuance 630. In one embodiment, to compute a generalization of disagreements for signed networks, data integrity system 350 defines w' as the edge weights scaled to the range [0, 1]:

$$w'(i,j) = \begin{cases} \frac{w(i,j)+1}{2}, & \text{if } G \text{ is a signed network} \\ w(i,j), & \text{if } G \text{ is an unsigned network} \end{cases} \quad (9)$$

where t is an edge weight in the graph G. Data integrity system 350 defines a disagreement as:

$$d'(i,j)=w'(i,j)*d(i,j)+(1-w'(i,j))*(1-d(i,j)) \quad (10)$$

where
d'(i,j): weighted disagreement;
w'(i,j): linearly transformed vote value t belongs to [−1, 1]→t belongs to [0,1]; and
d(i,j): disagreement value as defined in (ii).

Figure 7:
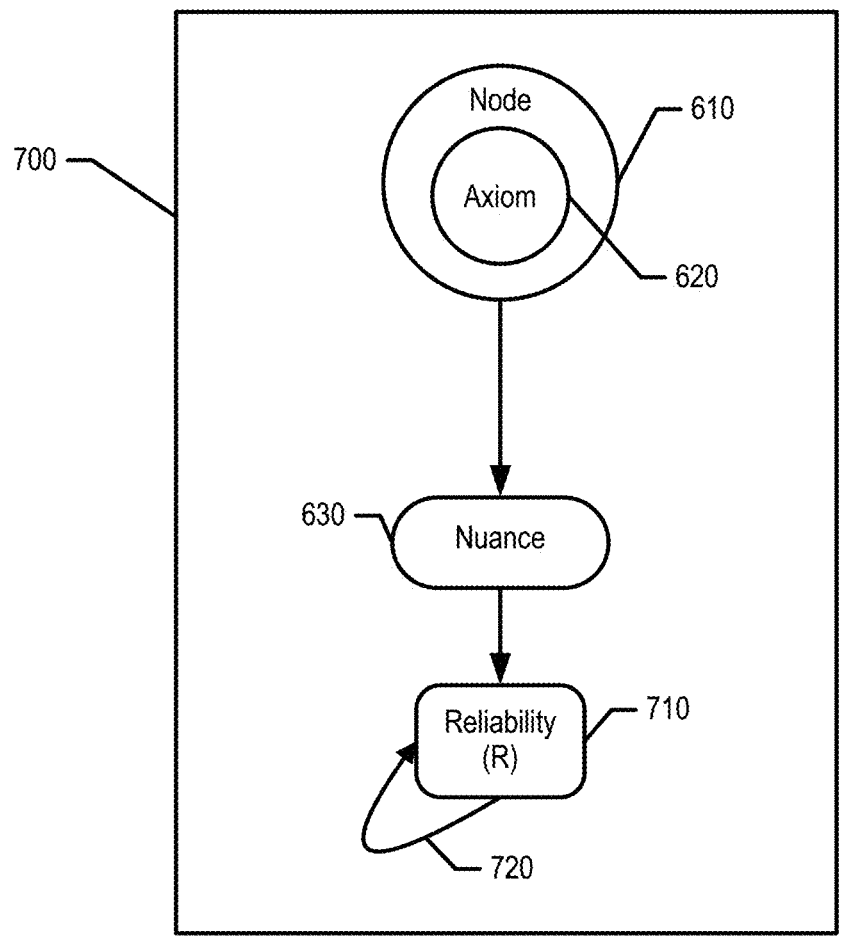
FIG. 7 is an exemplary diagram showing a relationship between a node, axiom, nuance, and reliability.

FIG. 7 is an exemplary diagram showing a relationship between a node, axiom, nuance, and reliability. Diagram 700 shows node 610, axiom 620, nuance 630, and reliability 710. For a data point n, data integrity system 350 computes nuance 630 as discussed above. Using nuance 630 and edge weights, data integrity system 350 computes reliability 710 of each node where the reliability of a node, in one embodiment, is defined as an eigenvector centrality of the adjacency matrix of the (unsigned) graph modified with the nuance values:

$$R=A^T R \quad (1)$$

where A is a modified adjacency matrix of a graph defined by the edge weights $w_{ij}$, and scaled by the nuance of the destination node j, $\eta_j$, which can be defined by any of the following equations:

$$A[i,j]=w_{i,j}*\eta_j \quad 1.$$

$$A[i,j]=w_{ij}^{1/\psi}*\eta_j^{1/\phi}, \text{ where } \psi,\phi \in [0,1] \quad 2.$$

$$A[i,j]=\psi*w_{ij}+\phi*\eta_j, \text{ where } \psi,\phi \in [0,\sqrt{}) \quad 3.$$

$$A[i,j]=\psi*w_{ij}+\phi*\eta_j^\theta, \text{ where } \psi,\phi \in [0,\infty) \text{ and } \theta \in [-1,1]$$

Data integrity system 350 iteratively computes the eigenvector where, after each iteration (720), data integrity system 350 scores the nodes based on reliability. Data integrity system 350 reaches a convergence condition when a Spearman correlation score of reliability values of nodes exceeds 1−ε for an arbitrarily small ε for several iterations. Data integrity system 350 scores the nodes based on reliability after the iterations converge.

As described above, the convergence criterion is defined on a Spearman correlation score of the reliability values. Upon convergence of all iterative computations, data integrity system 350 scores the nodes of the network based on reliability to determine which nodes are the most impactful in preserving data-integrity.

Figure 8:
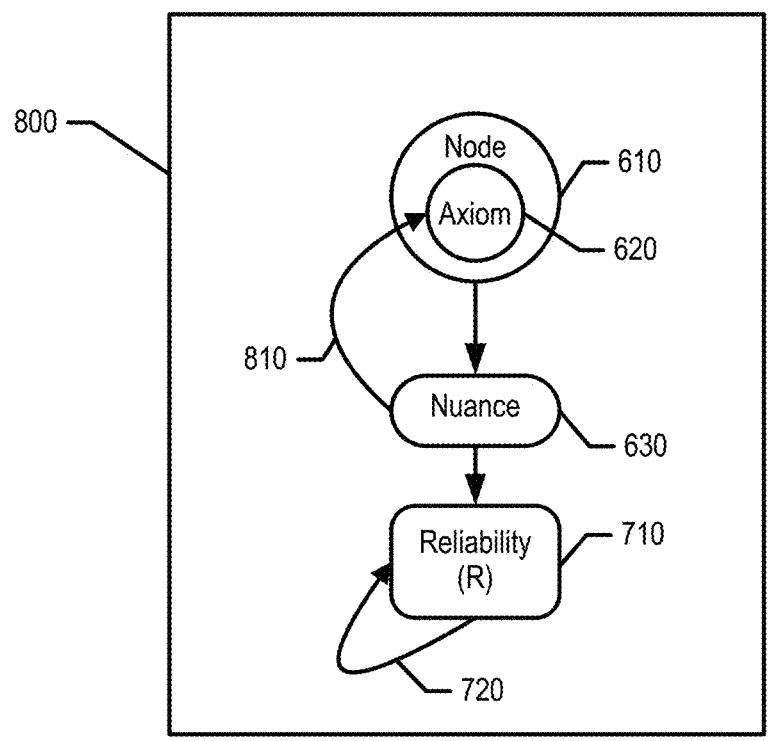
FIG. 8 is an exemplary diagram depicting two embodiments that iteratively update node axioms in a cognitive multi-agent system based on nuances and reliability.
Figure 8:
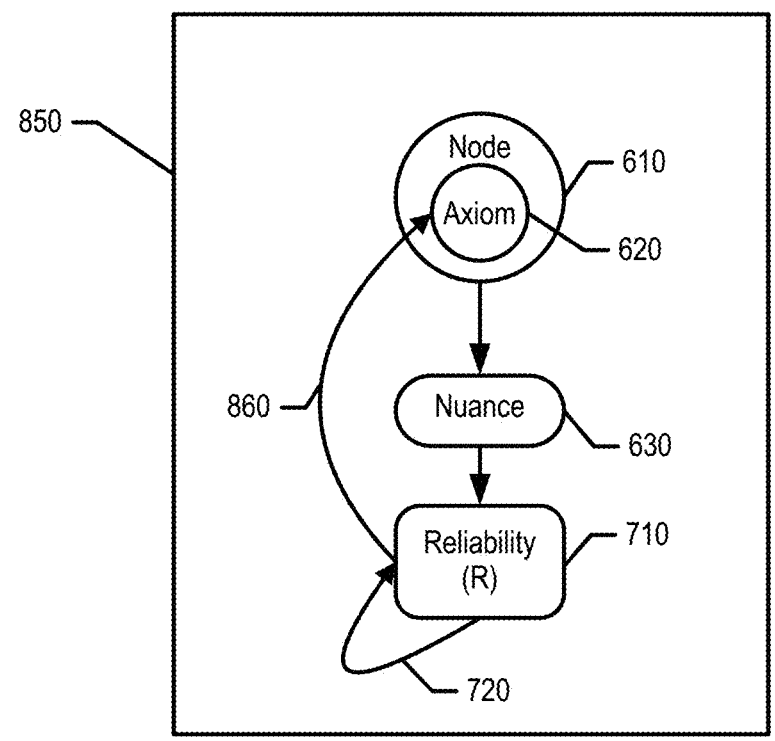

FIG. 8 is an exemplary diagram depicting two embodiments that iteratively update node axioms in a cognitive multi-agent system based on nuances and reliability. As discussed above, for a data point n, data integrity system 350 computes a nuance and reliability of each node using the nuance and edge weights. After each iteration, data integrity system 350 scores the nodes based on reliability and a convergence condition is reached when the Spearman correlation score of reliability values of nodes exceeds 1−ε for an arbitrarily small ε for several iterations.

Upon convergence of all iterative computations, data integrity system 350 scores nodes 310 based on their corresponding reliability and nuance. The purpose of scoring is two-fold, which are i) to determine the convergence of the iterative computation of reliability and nuance; and ii) to determine which nodes are most reliable for preserving data-integrity.

Model 800 updates axiom 620 using the following formula that uses a weighted sum of the axiom value in previous iterations and the impact of its neighbors:

$$X_{k+1}(i) = (1-\delta)X_k(i) + \delta\left(\sum_{j\in N_{in}} \eta_k(j)^\beta X_k(j)\right)\eta_k(i)^\alpha$$

$X_k$: Axiom in kth iteration
i: Node whose axiom is being updated
$N_{in}$: In-neighbors of the node
δ: weight given to impact of the in-neighbor in kth iteration
η: Nuance of node The extent of impact depends on axiom and nuance of its neighbors and its own nuance. Model 800 has two iterative processes. The first iterative process leads to a convergence of nuance and axiom (810). Once the axiom has converged, the second iterative process computes the reliability (720). Nuance convergence always precedes reliability convergence. Data integrity system 350 defines this behavior as binary convergence for axiom and nuance followed by unary convergence of reliability.

Model 850 is similar to model 800 except that the impact term now depends on reliability of its neighbors instead of nuance 630:

$$X_{k+1} = (1-\delta)X_k + \delta\left(\sum_{j \in N_{in}} R_k(j)^\beta X_k(j)\right)\eta^\alpha$$

$X_k$: Axiom in kth iteration;
i: Node whose axiom is being updated;
$N_{in}$: In-neighbors of the node;
δ: weight given to impact of the in-neighbor in kth iteration; and
R: Reliability of node.

Model 850 has two nested iterative processes. The inner iterative process computes reliability from nuance (720). Upon convergence of reliability, the axiom is updated (860), which is the outer iterative process. In turn, the newly computed nuance 630 leads back to the iterative process to compute reliability. Data integrity system 350 terms this behavior as ternary convergence of axiom, nuance and reliability.

In one embodiment, data integrity system 350 uses a third model to iteratively update nodes 310's axioms, which is a time-based model. The third model tracks how axioms change over a time period:

$X'=dX/dt$ where X' is the first order derivative of axiom vector of a node with respect to time. To find a consistency of a node, data integrity system 350 tracks how often the node's axiom varies. Data integrity system 350 finds the second order derivative of the axiom over time and calculates the root mean square error (RMSE) with a zero vector (which represents the origin) given by:

$RMSE(X'', \vec{0})$

In this embodiment, data integrity system 350 defines the consistency, C, of a node as:

$C=1-RMSE(X'', \vec{0})$ where the lesser the RMSE, the more the node consistency. Data integrity system 350 uses the consistency of the node as an additional parameter for data integrity system 350's axiom update process using the following equation:

$X_{t+1}(k,i)=\delta X_t(k,i)\theta_t + (1-\delta)(\Sigma_{j \in N_{in}} \eta_j(j,k)X_t(j,k)P_t(j,k))$ $X_t$: Axiom at time t;
k: Iteration number;
i: Node whose axiom is being updated;
$N_{in}$: In-neighbors of the node;

$\eta_j$: Nuance of node j;
$P_j$: Dependability of node j; and
δ: weight given to impact of the in-neighbor in kth iteration.

Data integrity system 350 may use model 800, model 850, the time-based model, and/or other models to preserve data integrity of nodes 310 in cognitive multi-agent systems 300.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A computer-implemented method comprising:
applying, by a first node, a first axiom to a set of data points to generate a set of first outputs;
applying, by a second node, a second axiom to the set of data points to generate a set of second outputs, wherein the first node and the second node are part of a computer network comprising a plurality of nodes;
computing a first nuance based on a set of disagreements between the set of first outputs and the set of second outputs; and
adjusting a reliability of the first node in the computer network based on the first nuance.

2. The computer-implemented method of claim 1 further comprising:
capturing the set of first outputs and the set of second outputs over a time period; and
computing the set of disagreements between the set of first outputs and the set of second outputs over the time period, wherein the first nuance is a variance of the set of disagreements between the set of first outputs and the set of second outputs over the time period.

3. The computer-implemented method of claim 1 further comprising:
iteratively computing the reliability of the first node based on a set of edge weights corresponding to a set of neighboring nodes and the first nuance until the reliability reaches a convergence condition based on the set of edge weights.

4. The computer-implemented method of claim 3 further comprising:
prior to iteratively computing the reliability of the first node, iteratively adjusting the first axiom based on a weighted sum of a set of iterative nuance computations to converge the first axiom and the first nuance.

5. The computer-implemented method of claim 3 further comprising:
in response to iteratively computing the reliability of the first node, iteratively adjusting the first axiom to converge the first axiom, the first nuance, and the reliability.

6. The computer-implemented method of claim 5 further comprising:
tracking a set of adjustments of the first axiom over a time period;
determining a consistency of the first node based on the set of adjustments; and
including the consistency as a factor during the iterative adjusting of the first axiom.

7. The computer-implemented method of claim 1 wherein the computer network is a cognitive multi-agent system comprising a set of independent nodes, and wherein the method further comprises:
enabling the set of independent nodes comprising the first node and the second node to maintain autonomous cognitive processes based on a set of axioms comprising the first axiom and the second axiom;
enabling the set of independent nodes to interact with each other and exchange the set of data points; and
enabling a set of networks comprising the set of independent nodes in the cognitive multi-agent system to capture a set of up-vote relationships and a set of down-vote relationships between the set of independent nodes.

8. A computer program product stored in a computer readable storage medium, comprising computer program code that, when executed by an information handling system, causes the information handling system to perform actions comprising:
applying, by a first node, a first axiom to a set of data points to generate a set of first outputs;
applying, by a second node, a second axiom to the set of data points to generate a set of second outputs, wherein the first node and the second node are part of a computer network comprising a plurality of nodes;
computing a first nuance based on a set of disagreements between the set of first outputs and the set of second outputs; and
adjusting a reliability of the first node in the computer network based on the first nuance.

9. The computer program product of claim 8 wherein the information handling system performs further actions comprising:
capturing the set of first outputs and the set of second outputs over a time period; and
computing the set of disagreements between the set of first outputs and the set of second outputs over the time period, wherein the first nuance is a variance of the set of disagreements between the set of first outputs and the set of second outputs over the time period.

10. The computer program product of claim 8 wherein the information handling system performs further actions comprising:
iteratively computing the reliability of the first node based on a set of edge weights corresponding to a set of neighboring nodes and the first nuance until the reliability reaches a convergence condition based on the set of edge weights.

11. The computer program product of claim 10 wherein the information handling system performs further actions comprising:
prior to iteratively computing the reliability of the first node, iteratively adjusting the first axiom based on a weighted sum of a set of iterative nuance computations to converge the first axiom and the first nuance.

12. The computer program product of claim 10 wherein the information handling system performs further actions comprising:
in response to iteratively computing the reliability of the first node, iteratively adjusting the first axiom to converge the first axiom, the first nuance, and the reliability.

13. The computer program product of claim 12 wherein the information handling system performs further actions comprising:
tracking a set of adjustments of the first axiom over a time period;
determining a consistency of the first node based on the set of adjustments; and
including the consistency as a factor during the iterative adjusting of the first axiom.

14. An information handling system comprising:
one or more processors;
a memory coupled to at least one of the processors;
a set of computer program instructions stored in the memory and executed by at least one of the processors in order to perform actions of:
applying, by a first node, a first axiom to a set of data points to generate a set of first outputs;
applying, by a second node, a second axiom to the set of data points to generate a set of second outputs, wherein the first node and the second node are part of a computer network comprising a plurality of nodes;
computing a first nuance based on a set of disagreements between the set of first outputs and the set of second outputs; and
adjusting a reliability of the first node in the computer network based on the first nuance.

15. The information handling system of claim 14 wherein the processors perform additional actions comprising:
capturing the set of first outputs and the set of second outputs over a time period; and
computing the set of disagreements between the set of first outputs and the set of second outputs over the time period, wherein the first nuance is a variance of the set of disagreements between the set of first outputs and the set of second outputs over the time period.

16. The information handling system of claim 14 wherein the processors perform additional actions comprising:
iteratively computing the reliability of the first node based on a set of edge weights corresponding to a set of neighboring nodes and the first nuance until the reliability reaches a convergence condition based on the set of edge weights.

17. The information handling system of claim 16 wherein the processors perform additional actions comprising:
prior to iteratively computing the reliability of the first node, iteratively adjusting the first axiom based on a weighted sum of a set of iterative nuance computations to converge the first axiom and the first nuance.

18. The information handling system of claim 16 wherein the processors perform additional actions comprising:
in response to iteratively computing the reliability of the first node, iteratively adjusting the first axiom to converge the first axiom, the first nuance, and the reliability.

19. The information handling system of claim 18 wherein the processors perform additional actions comprising:
   tracking a set of adjustments of the first axiom over a time period;
   determining a consistency of the first node based on the set of adjustments; and
   including the consistency as a factor during the iterative adjusting of the first axiom.

20. The information handling system of claim 14 wherein the computer network is a cognitive multi-agent system comprising a set of independent nodes, and wherein the processors perform additional actions comprising:
   enabling the set of independent nodes comprising the first node and the second node to maintain autonomous cognitive processes based on a set of axioms comprising the first axiom and the second axiom;
   enabling the set of independent nodes to interact with each other and exchange the set of data points; and
   enabling a set of networks comprising the set of independent nodes in the cognitive multi-agent system to capture a set of up-vote relationships and a set of down-vote relationships between the set of independent nodes.

\* \* \* \* \*